(12) United States Patent
Salkini et al.

(10) Patent No.: US 9,295,071 B2
(45) Date of Patent: *Mar. 22, 2016

(54) INTELLIGENT NETWORK ACCESS CONTROLLER AND METHOD

(71) Applicant: TECORE, INC., Hanover, MD (US)

(72) Inventors: Jay Salkini, Columbia, MD (US); Thomas Joseph, Lothian, MD (US)

(73) Assignee: TECORE, INC., Hanover, MD (US)

(*) Notice: Subject to any disclaimer, the term of this patent is extended or adjusted under 35 U.S.C. 154(b) by 152 days.

This patent is subject to a terminal disclaimer.

(21) Appl. No.: 13/939,403

(22) Filed: Jul. 11, 2013

(65) Prior Publication Data

US 2013/0301574 A1 Nov. 14, 2013

Related U.S. Application Data

(63) Continuation of application No. 13/507,675, filed on Jul. 19, 2012, now Pat. No. 8,509,740, which is a continuation of application No. 12/318,020, filed on Dec. 19, 2008, now Pat. No. 8,437,741.

(51) Int. Cl.
  *H04L 1/00* (2006.01)
  *H04W 72/10* (2009.01)
  (Continued)

(52) U.S. Cl.
  CPC ............... *H04W 72/10* (2013.01); *H04L 63/08* (2013.01); *H04W 12/06* (2013.01); *H04W 12/12* (2013.01); *H04W 48/04* (2013.01)

(58) Field of Classification Search
  CPC ..... H04W 12/06; H04W 12/12; H04W 12/08; H04W 88/02; H04W 84/18; H04W 84/12; H04L 63/08

USPC .................. 370/310, 329, 341, 352; 455/411, 455/414.1, 455, 556, 565
See application file for complete search history.

(56) References Cited

U.S. PATENT DOCUMENTS 4,790,000 A 12/1988 Kinoshita
5,278,890 A 1/1994 Beeson, Jr. et al.
(Continued)

FOREIGN PATENT DOCUMENTS

EP 1155515 B1 7/2006
WO 97/42783 A2 11/1997
WO 98/16054 A1 4/1998

OTHER PUBLICATIONS

Fletcher, Anthony G et al., United States Statutory Invention Registration H1,921, "Generic Wireless Telcommunications System," published Nov. 7, 2000.

*Primary Examiner* — Dady Chery

(57) ABSTRACT

A method for dynamically controlling wireless communications includes establishing a targeted coverage area as an overlay to a portion of a wireless network; and at a first wireless network access controller: establishing an attraction process that compels wireless devices within the targeted coverage area to attempt to register with the first network access controller, receiving a registration signal from a wireless device, and determining an access category for the wireless device based on the received registration signal. Determining access categories includes enabling wireless communication access limitations for a first category of wireless devices, wherein the first network access controller provides to the wireless device, an appearance of operating on the wireless network; allowing limited wireless communications access for a second category of wireless devices.

51 Claims, 7 Drawing Sheets

(51) Int. Cl.
*H04W 48/04* (2009.01)
*H04L 29/06* (2006.01)
*H04W 12/06* (2009.01)
*H04W 12/12* (2009.01)

(56) References Cited

U.S. PATENT DOCUMENTS

| | | |
|---|---|---|
| 5,285,494 A | 2/1994 | Sprecher et al. |
| 5,289,179 A | 2/1994 | Beeson, Jr. et al. |
| 5,345,498 A | 9/1994 | Mauger et al. |
| 5,414,750 A | 5/1995 | Bhagat et al. |
| 5,420,863 A | 5/1995 | Taketsugu et al. |
| 5,440,613 A | 8/1995 | Fuentes |
| 5,440,758 A | 8/1995 | Grube et al. |
| 5,440,759 A | 8/1995 | Barnes et al. |
| 5,465,386 A | 11/1995 | Barnes et al. |
| 5,490,285 A | 2/1996 | Ahlenius et al. |
| 5,497,411 A | 3/1996 | Pellerin |
| 5,519,760 A | 5/1996 | Borkowski et al. |
| 5,521,962 A | 5/1996 | Chavez, Jr. |
| 5,539,730 A | 7/1996 | Dent |
| 5,548,802 A | 8/1996 | Barnes et al. |
| 5,550,896 A | 8/1996 | Chavez, Jr. |
| 5,561,841 A | 10/1996 | Markus |
| 5,572,579 A | 11/1996 | Orriss et al. |
| 5,574,788 A | 11/1996 | Childress et al. |
| 5,577,198 A | 11/1996 | Willrett et al. |
| 5,590,398 A | 12/1996 | Matthews |
| 5,592,480 A | 1/1997 | Carney et al. |
| 5,608,854 A | 3/1997 | Labedz et al. |
| 5,610,969 A | 3/1997 | McHenry et al. |
| 5,613,196 A | 3/1997 | Barnes et al. |
| 5,629,978 A | 5/1997 | Blumhardt et al. |
| 5,655,001 A | 8/1997 | Cline et al. |
| 5,666,356 A | 9/1997 | Fleming et al. |
| 5,711,006 A | 1/1998 | Brochu et al. |
| 5,729,536 A | 3/1998 | Doshi et al. |
| 5,812,955 A | 9/1998 | Dent et al. |
| 5,845,211 A | 12/1998 | Roach, Jr. |
| 5,878,036 A | 3/1999 | Spartz et al. |
| 5,920,822 A | 7/1999 | Houde et al. |
| 5,946,634 A | 8/1999 | Korpela |
| 5,953,331 A | 9/1999 | Duncan et al. |
| 6,081,731 A | 6/2000 | Boltz et al. |
| 6,188,898 B1 | 2/2001 | Phillips |
| 6,216,014 B1 | 4/2001 | Proust et al. |
| 6,272,562 B1 | 8/2001 | Scott et al. |
| 6,285,869 B1 | 9/2001 | Shannon et al. |
| 6,343,212 B1 | 1/2002 | Weber et al. |
| 6,591,095 B1 | 7/2003 | Palaniswamy et al. |
| 6,603,397 B2 | 8/2003 | Bronson |
| 6,625,455 B1 | 9/2003 | Ariga |
| 6,643,504 B1 | 11/2003 | Chow et al. |
| 6,678,516 B2 | 1/2004 | Nordman et al. |
| 6,775,536 B1 | 8/2004 | Geiger et al. |
| 7,006,816 B2 | 2/2006 | Remy |
| 7,046,990 B2 | 5/2006 | Grego et al. |
| 7,693,536 B2 | 4/2010 | Kogure |
| 8,078,190 B2 | 12/2011 | Noonan et al. |
| 8,254,886 B2 | 8/2012 | Salkini et al. |
| 2002/0098850 A1 | 7/2002 | Akhteruzzaman et al. |
| 2004/0198310 A1 | 10/2004 | Aerrabotu et al. |
| 2004/0213172 A1 | 10/2004 | Myers et al. |
| 2005/0190733 A1 | 9/2005 | Ishidoshiro |
| 2005/0272406 A1 | 12/2005 | Mizikovsky et al. |
| 2006/0105758 A1 | 5/2006 | Maislos |
| 2008/0008159 A1 | 1/2008 | Bourlas et al. |
| 2008/0057976 A1 | 3/2008 | Rae et al. |
| 2008/0146158 A1 | 6/2008 | Pan et al. |
| 2009/0069033 A1 | 3/2009 | Karstens et al. |
| 2009/0217047 A1 | 8/2009 | Akashika et al. |
| 2010/0159877 A1 | 6/2010 | Salkini et al. |
| 2010/0159879 A1 | 6/2010 | Salkini et al. |
| 2010/0228859 A1 | 9/2010 | Backstrom et al. |
| 2013/0303125 A1 | 11/2013 | Salkini et al. |

INTELLIGENT NETWORK ACCESS CONTROLLER AND METHOD

RELATED APPLICATIONS

This application is a continuation of, and claims priority to: U.S. patent application Ser. No. 13/507,675, entitled "Intelligent Network Access Controller and Method," filed Jul. 19, 2012, which is a continuation of U.S. patent application Ser. No. 12/318,020, now U.S. Pat. No. 8,437,741, entitled "Intelligent Network Access Controller and Method," filed Dec. 19, 2008; the disclosures of these two applications are hereby incorporated by reference in their entirety.

TECHNICAL FIELD

The technical field is wireless communications.

BACKGROUND

A key performance indicator of any wireless network is coverage. In addition to providing an evolving set of features to customers, the most successful wireless networks are those that provide ubiquitous coverage and service to as broad a base of subscribers as possible. Because of the emphasis on coverage, these same networks seldom, if ever, provide methods of restricted or controlled access for targeted areas in the network. However, with heightened security concerns, and for other reasons, targeted wireless access restriction may be an important consideration, especially in a localized area, and/or for specific time periods.

SUMMARY

An intelligent network access controller for use within a targeted area or areas provides communications services across some or all relevant wireless technologies and spectrums to subscribers having wireless communications devices. The controller produces the targeted coverage area, wherein wireless access limitations may be enabled by using interfaces for receiving and sending digital messaging by the wireless communications devices; an identification module that determines an identity of a wireless communications device; an access module that receives the identity and determines an access level for the wireless communications device; and a locking module that implements logic that accepts, releases, or allows service to selected wireless communications devices to the controller based on the determined access level.

A method for restricting access to wireless communications to and from a wireless network comprises the steps of provoking access to the intelligent network access controller through a registration request or call/text message/or data session initiation from a wireless communications device; determining a category of the wireless communications device; if the determined category is a first category, accepting the access of the device to the intelligent network access controller and thus locking the wireless communications device to the broadcast signal transmitted by the intelligent network access controller so that access to the wireless network is prevented; and if the determined category is a second category, redirecting the wireless communications device to re-attempt access with the wireless network.

DESCRIPTION OF THE DRAWINGS

The detailed description will refer to the following figures in which like numerals refer to like items, and in which.

DETAILED DESCRIPTION

Figure 1:
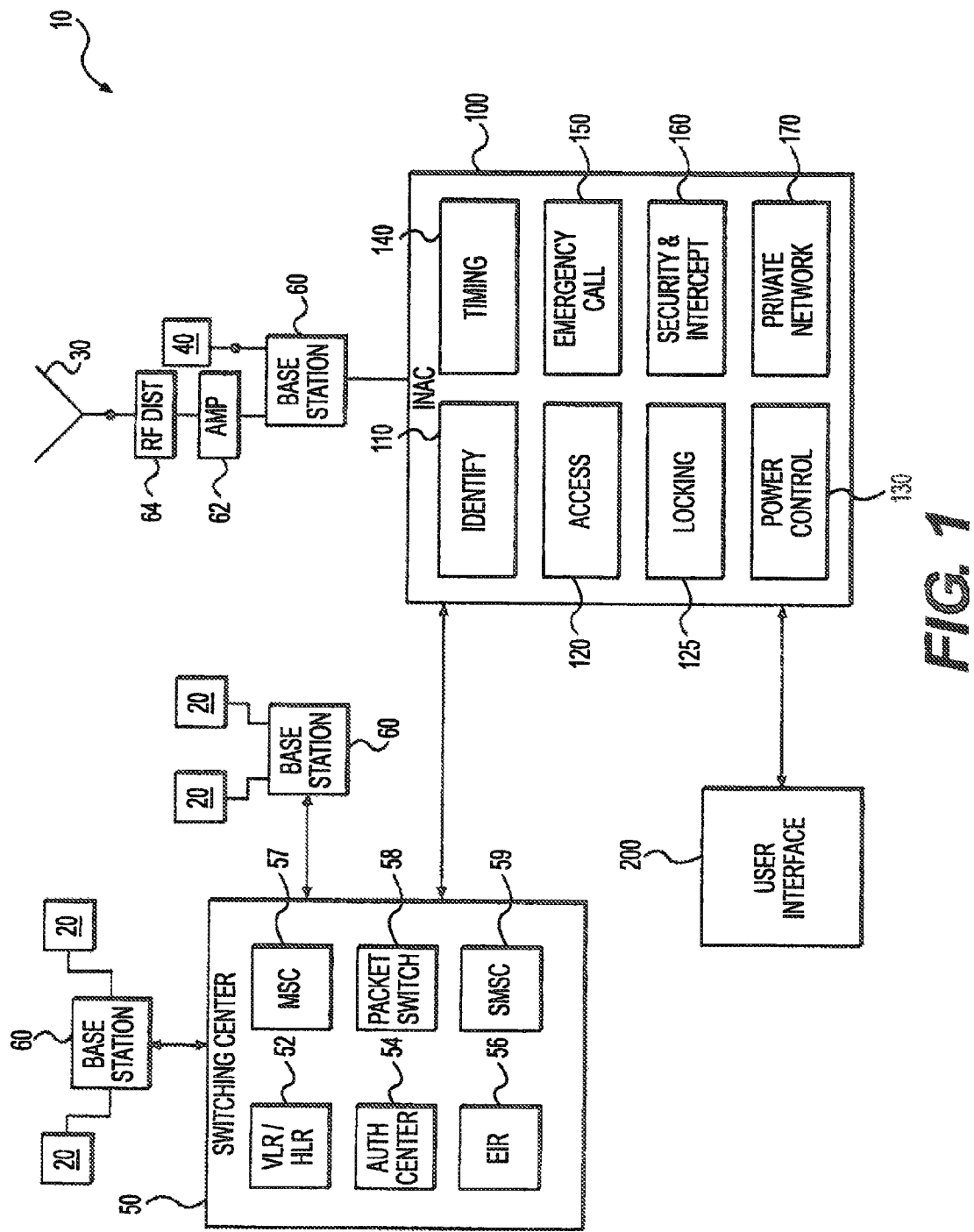
FIG. 1 is a block diagram of a wireless network incorporating an exemplary intelligent network access controller.

A key performance indicator of any wireless network is coverage. The most successful wireless networks are those that have ever-expanding coverage, independent of time, to provide ubiquitous service to any and all subscribers and roaming users. Because of the emphasis on coverage, these same networks seldom, if ever, operate so as to restrict access. However, with heightened security concerns, and for other reasons, wireless access restriction may be an important consideration, especially in a localized area, and/or for specific time periods.

Current systems that impose some type of wireless access restriction function may employ jamming equipment to block wireless signals in a particular area. Other systems rely on shutdown of a cell or sector. These current wireless access restriction solutions do not discriminate among users. Instead, these solutions impose a total prohibition on wireless communications. Furthermore, these current solutions are complicated and expensive to invoke. Finally, with these current solutions, if a situation requires that certain personnel (e.g., emergency response personnel) be able to communicate using wireless communications, a secondary communications network must be established since jamming or cell shutdown prohibits all wireless communications for a given wireless technology.

In most cases jamming works across a spectrum of radio frequencies and jams the use of the entire spectrum regardless of the wireless technology or technologies deployed in the spectrum. So in the case of jamming, a localized communications network must be established on its own technology, unique devices, and spectrum further complicating the setup and operations.

Another challenge is that in most areas covered by wireless communications there are typically multiple technologies operating in a variety of spectrum ranges. Jamming solutions and cell turn down are absolute solutions that do not provide the ability to select on a device by device basis the ability to use the wireless communication within the target area.

To overcome these limitations with current art wireless communication access restriction solutions, disclosed herein is an intelligent network access controller, and accompanying method, which is shown in FIGS. 6A-6D, that either permanently or temporarily limits allowable communications on an existing wireless network to only a subset of that network's normal users. Those users not in the subset of allowable users are blocked from access to the wireless network when located in a specified area normally covered by the wireless network and/or for a specified time.

The intelligent network access controller provides, on a single platform, the necessary components for an end-to-end solution for selective communications restriction across the spectrum of wireless technology, frequency, and access methodology. In an embodiment, wireless users are classified into categories and either allowed to access the wireless networks or are prohibited access, on a subscriber-by-subscriber basis. The intelligent network access controller meets the criteria of service restriction that may be required in specific areas, while allowing selected individuals wireless communications access to wireless networks in those same areas. Thus, the intelligent network access controller eliminates the need to overlay additional communications systems to provide targeted localized wireless communications. The intelligent network access controller implements its service across both commercial as well as private wireless networks.

The intelligent network access controller is particularly useful in certain permanent facilities such as embassies, government facilities, prisons, military installations, stadiums and arenas, hospitals, public transportation facilities, landmarks, and in temporary applications including disaster recovery operations and homeland security operations. In short, the intelligent network access controller can be used in any situation or at any facility or locale to establish a controlled wireless communications environment whereby only selected individuals can access a wireless communications network.

Figure 6A:
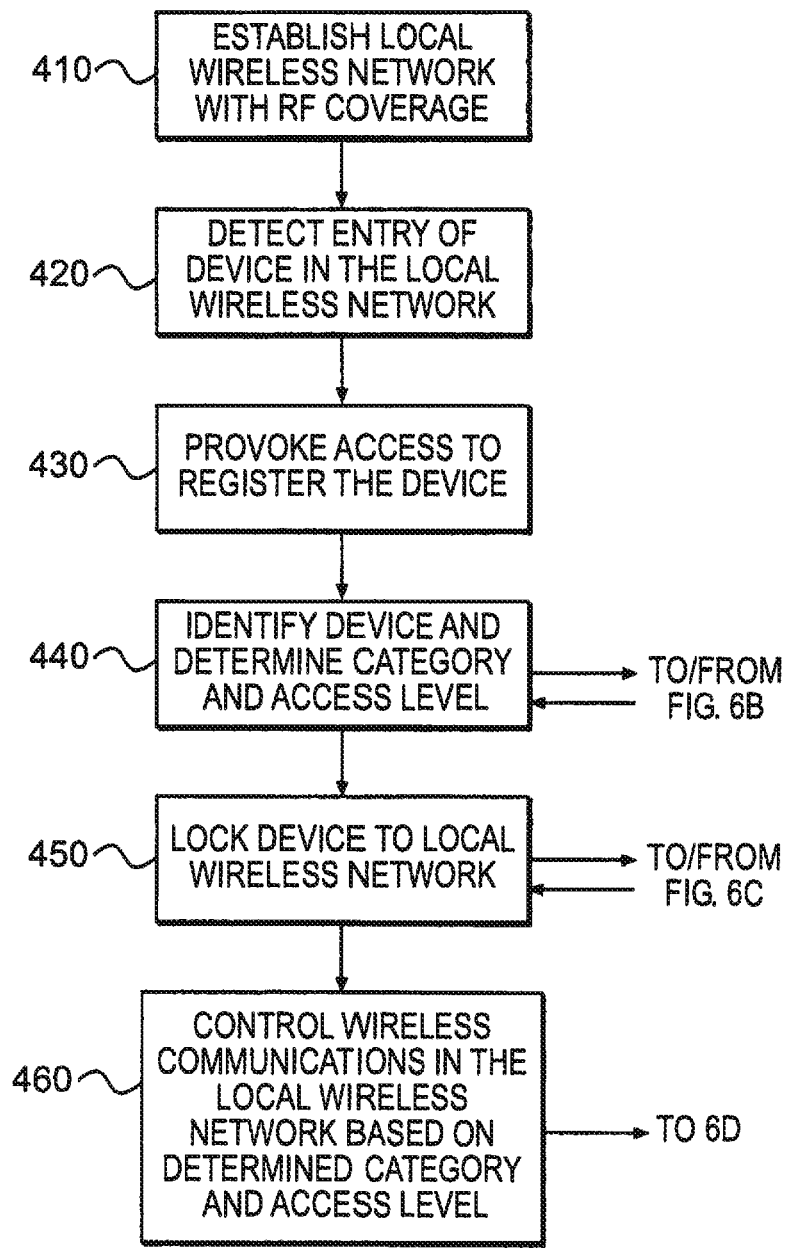
FIGS. 6A-6D illustrate an embodiment of a method for creating a local wireless network and for controlling wireless communications using the local wireless network.

FIG. 1 is a block diagram of a wireless communications network that incorporates an exemplary intelligent network access controller and other wireless network components to provide access restriction features. In FIG. 1, wireless network 10 includes switching center 50 and base stations 60, through which devices 20 establish wireless communications. Overlaying the network 10 are directional antennae 30 and repeaters 40 that operate in conjunction with intelligent network access controller (INAC) 100, to restrict or to allow wireless communication from and to selected devices 20. The switching center 50 includes standard components that may be found in any switching center, including a VLR and a HLR 52, authentication center 54, equipment identification register 56, a mobile switching center (MSC) 57, a packet switch 58 and a short message service center (SMSC) 59. Ordinarily, a subscriber using a device 20 would have that device 20 registered with the network 10 once the device 20 was within the coverage area of the network 10. However, to provide access restriction on either a temporary or a permanent basis, the INAC 100, and associated interface 200, which facilitates human operator interaction with the controller 100, may be used to "lock" selected devices 20 to the INAC 100, the method of which is shown in FIG. 6A, block 430, and thus prevent access to the wireless network 10.

"Locking" the wireless devices to the INAC 100 indicates that the wireless device 20 is tuned to and has been accepted by the local signal broadcast of the INAC 100. The INAC 100 implements a mimicked signal that may follow the signal patterns, parameters, and characteristics of the underlying wireless network; however the localized signal is only connected to the INAC 100 and not the wireless network as a whole. The end result is a wireless device that has the appearance of operating on the wireless network; however by virtue of the wireless device 20 being tuned to the local INAC 100 signal, the wireless device 20 is by default "locked" from access to the wireless network outside the coverage area of the INAC 100.

A "device" or "wireless device" includes any wireless access mechanism including wireless handheld devices used for communications and laptop computers, personal digital assistants, or other computing device that includes wireless access technology.

A "wireless network" includes networks that provide commercial or private wireless access for voice, text, and or data access.

The INAC 100 may be implemented as an adjunct to the wireless network 10, as an integrated feature within the wireless network, or may be implemented as a standalone device that is independent of any specific wireless network.

The INAC 100 may be implemented as software, hardware, or a combination of hardware and software. The INAC 100 may be implemented on a suitably programmable processor.

Figure 6B:
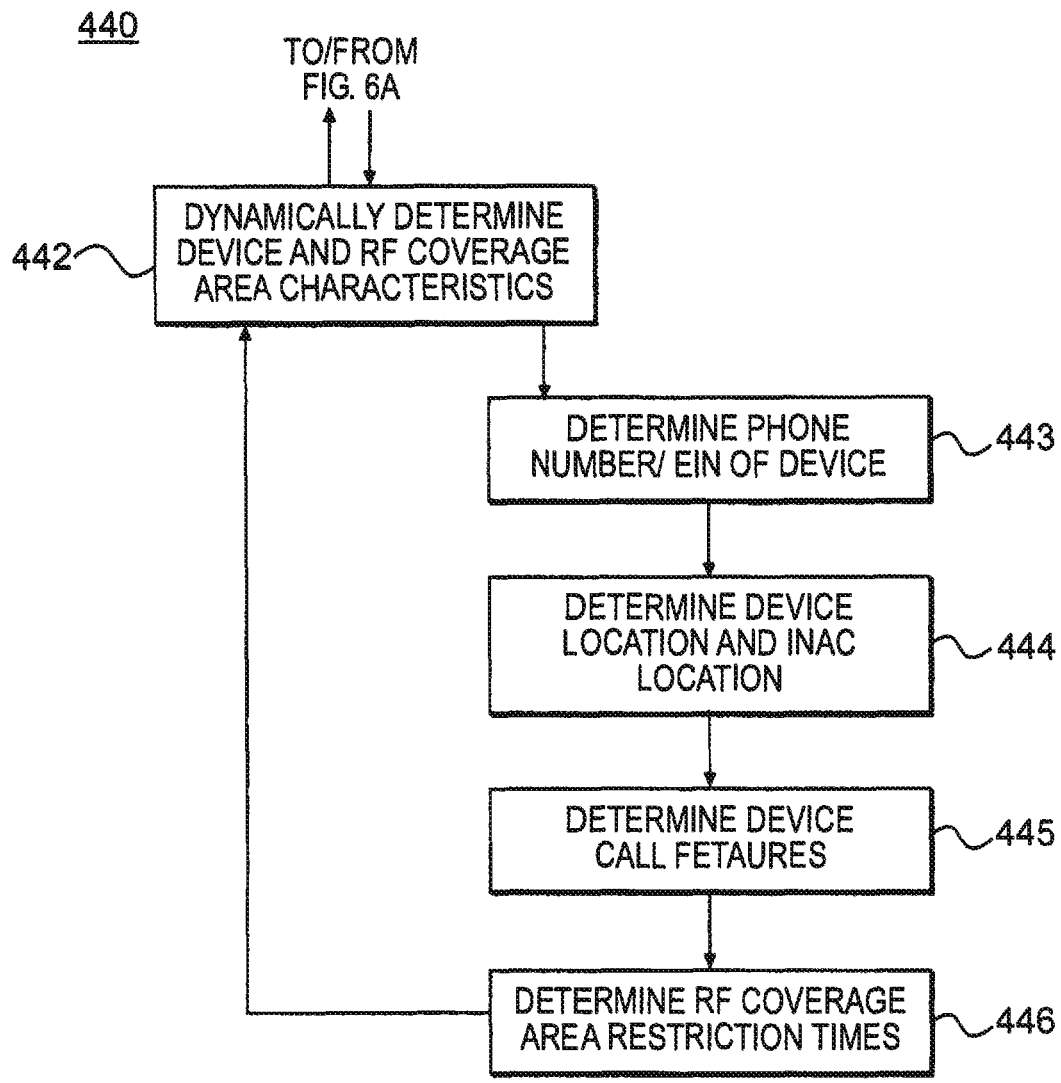
Figure 6C:
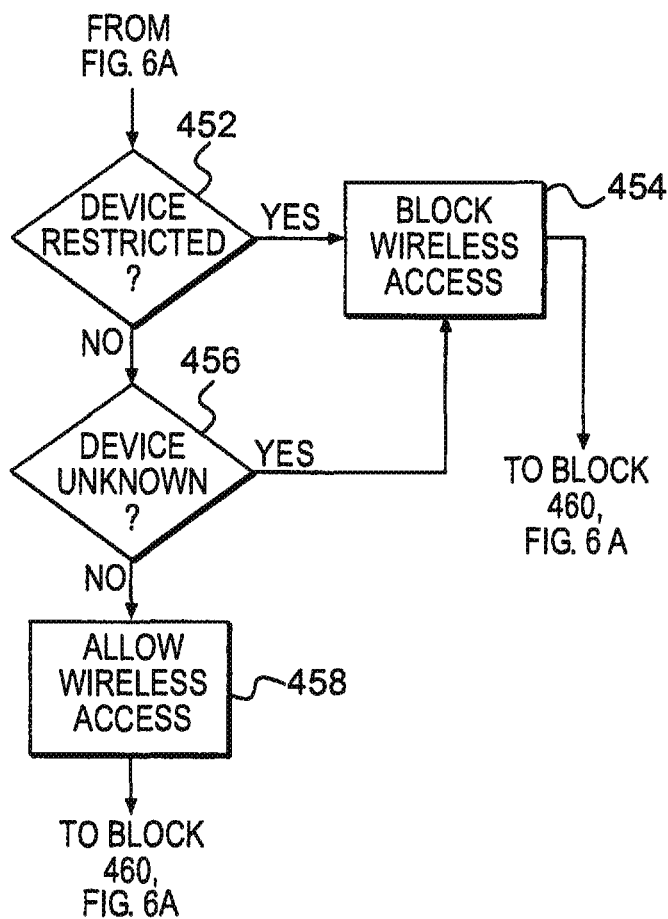
Figure 6D:
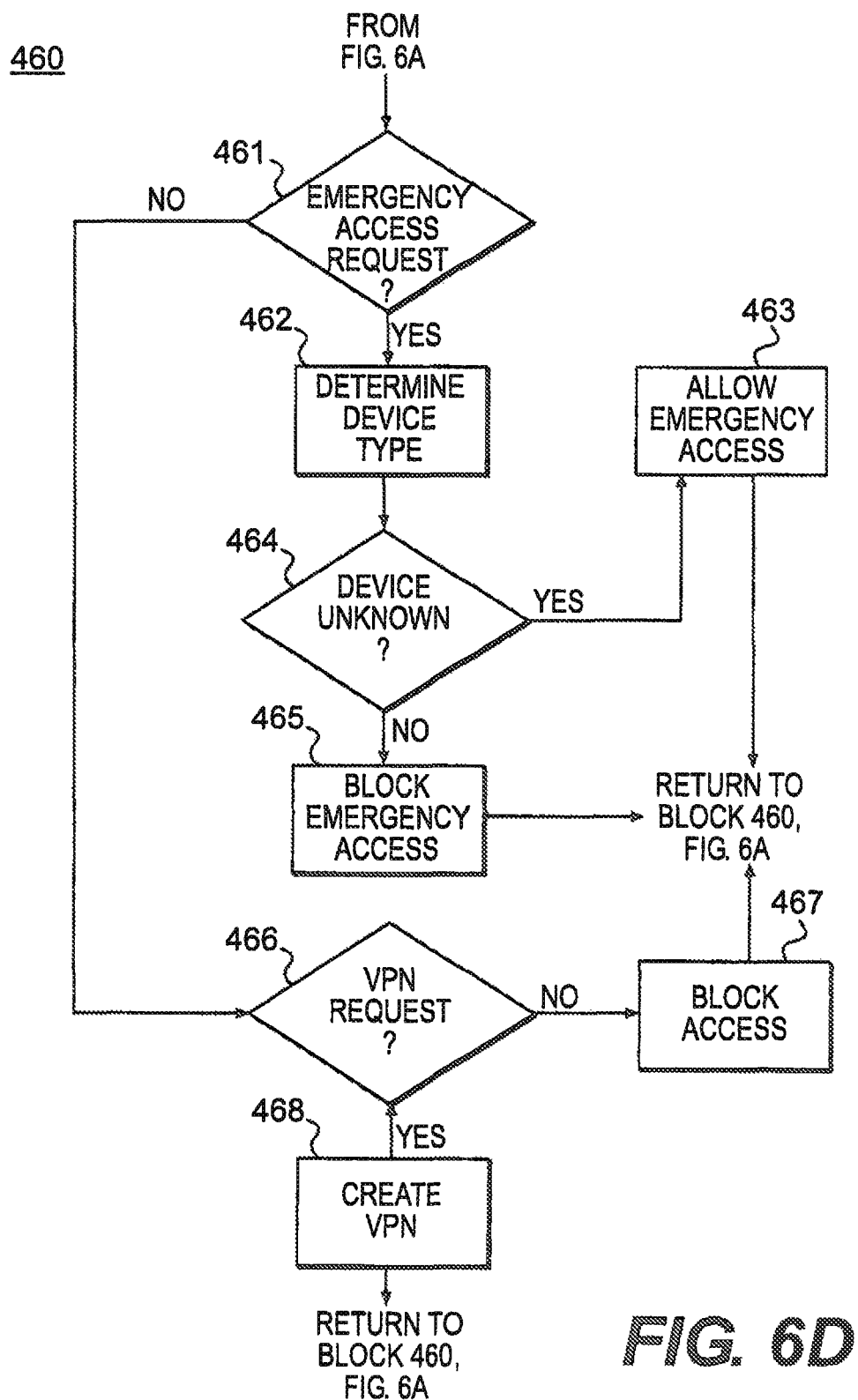

The INAC 100 includes equipment identity module 110 that receives and stores identifying information associated with devices 20, the method of which is shown in FIG. 6B, block 443; access module 120 that determines, based on setup or operational mode of the INAC 100, which of the devices 20 are to be allowed access to the wireless communications network 10; locking module 125, which is used to lock a device 20 to the INAC 100 and to provide indications to the locked device 20 that make it appear that the device 20 actually is registered with the wireless network 10; power control module 130, which operates in conjunction with base station 60, RF distribution equipment 62, amplifiers 64 directional antennae 30 and repeaters 40 to establish, per FIG. 6A, block 410, the area subject to the access restrictions imposed by the INAC 100; timing module 140, which may be used to impose temporal limitations on the access restriction functions per FIG. 6B, block 446; and emergency access module 150, which operates as shown in FIG. 6D, blocks 461-465, to allow certain access types (e.g., emergency 911 calls from a wireless device 20) while other access types remain blocked.

The INAC 100 provides, as shown in FIG. 6A, block 440 and FIG. 6B, blocks 442-445, discretionary blocking of access to and from devices 20 by recognizing differences among the devices 20. In an embodiment, the INAC 100 recognizes three categories of subscriber devices 20: restricted, allowed, and unknown. Restricted devices are those that are identified as belonging to subscribers who are to be denied wireless access (e.g., prisoners, terrorists). Restricted devices are configured by the INAC 100 so as not to be allowed cellular service and access to the wireless network 10. Every device 20 has a unique identifying number or characteristic, which is determined as shown in FIG. 6A, block 440. If the device identifying number or characteristic (e.g., subscriber number) is configured to be "restricted," the INAC 100 accepts that device's access and returns a positive acknowledgement to the device per FIG. 6C, block 452. This creates the illusion, at the subscriber's device 20, that the subscriber has gained access to and is operating within the wireless network 10, when in fact, the device 20 is locked to the INAC 100 until the device 20 is removed from the restricted access area imposed by the INAC 100. By locking the "restricted" device 20 to the INAC 100, all incoming and outgoing accesses by the device 20 are prevented while the "restricted" device 20 is within the restricted access area, the method of which is shown in FIG. 6C, blocks 452 and 454.

Allowed devices are those configured in the NAG 100 as to be allowed wireless service. After determining the identity of the device 20, and determining that the device 20 is an "allowed" device, the INAC 100 redirects the device 20 from the INAC 100 to the appropriate wireless network 10, as shown in FIG. 6C, block 458. This redirection forces the "allowed" device to reattempt access on the wireless network 10. Once so redirected, the "allowed" device's subscriber can use the device 20 for normal inbound and outbound traffic. See FIG. 6A, blocks 420, 440, 450, and 460.

Unknown devices 20 are those not specifically configured by the INAC 100 as allowed or restricted. Unknown devices 20 may be configured to allow normal wireless network access depending, for example, on a security level requirement at a given location (e.g., for homeland security threat conditions of orange and lower, unknown devices are allowed access to the wireless network 10), as shown in FIG. 6C, blocks 454 and 456.

The INAC 100 operates as a local overlay or underlay of the same frequency spectrum and configuration as the wireless network 10. The area of restricted access can extend to any part of the coverage area of the wireless network 10, and such restricted area may be enforced by the use of the power control module 130, directional antennae 30, and repeaters 40. Thus, the restricted area under control of the INAC 100 may be limited to a building, a sports stadium, or a geographical area, for example. The area of restricted wireless access is not necessarily static, and can be changed based on set criteria or at the discretion of a network operator. The end result is a targeted coverage area that can provide controlled and deterministic wireless communications access by subscribers. Once a restricted, or an unknown, subscriber's device 20 leaves the restricted access area, the subscriber's device 20 re-registers with the wireless network 10 and is no longer controlled (locked) by the INAC 100.

When the subscriber's device 20 is locked to the INAC 100, the locking module 125 operates to ensure that the device's display and apparent operation are the same as if the device 20 were registered with the wireless network 10. A subscriber who attempts to use a device 20 locked to the INAC 100 will see a failed access attempt, or similar warning. The subscriber's perception would likely then be that the device 20 was not receiving sufficient signal strength to enable wireless communications or the serving wireless network did not have the requisite capacity to service the access request. This further masks the purpose and operation of the INAC 100. Only after a repeated pattern of access denial is established would the typical subscriber discern the restricted access.

The INAC 100 can be configured to provide various levels of access depending on the configuration of the subscriber devices 20 and the level of security required for the access. The INAC's operational mode may be changed dynamically, either automatically, or manually. Automatic changes may be programmed using the interface 200. Examples of automatic changes are changes programmed into the INAC 100 based on time of day, day of week, or some other calendar-based criteria; the occurrence of a specific event (e.g., a concert); changes in threat levels (e.g., homeland security threat conditions—yellow, orange, etc.); and changes in an operational profile or physical location (of the INAC 100 or of the wireless device 20) (e.g., an aircraft descending below 10,000 feet, a ship entering port, a train arriving at a station). Manual changes may be implemented directly by a system operator by using the interface 200. For any of the modes of operation, the INAC 100 provides a logging mechanism to track all system access attempts and the resulting status. Additionally the INAC 100 provides capability to view the existing database information including the allowed and restricted lists, system configuration, system statistics, and log of system activity.

Figure 2:
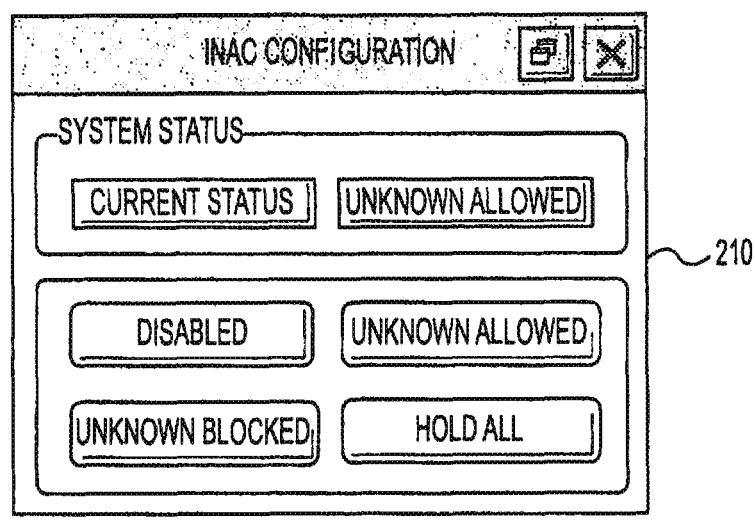
FIG. 2 illustrates an exemplary interface for enabling wireless access restrictions using the controller of FIG. 1.

The INAC's operational modes include disabled, wherein the access restrictions imposable by the INAC 100 are suspended; hold all, or virtual jam, wherein all wireless communications are processed as locked to the INAC 100; unknown allowed, wherein only known "restricted" devices are locked to the INAC 100; and unknown blocked, in which both restricted and unknown devices are locked to the INAC 100. FIG. 2 illustrates an exemplary interface 210 produced by the interface 200 and the INAC 100 for enabling wireless access restrictions. Additionally, the INAC 100 can also operate in a passive mode where all subscriber access is redirected to the appropriate wireless network.

As subscribers access the INAC 100, and either are locked to the INAC 100 or redirected to the wireless network 10, the INAC 100 captures access information that can be used to generate access reports for each type of device 20 (i.e., unknown, bad, or good). The reports provide an organized analysis as to which users are accessing the system, including time period, call duration, and frequency of use. The reports also provide useful information for establishing system databases and use of the INAC 100.

Figure 3:
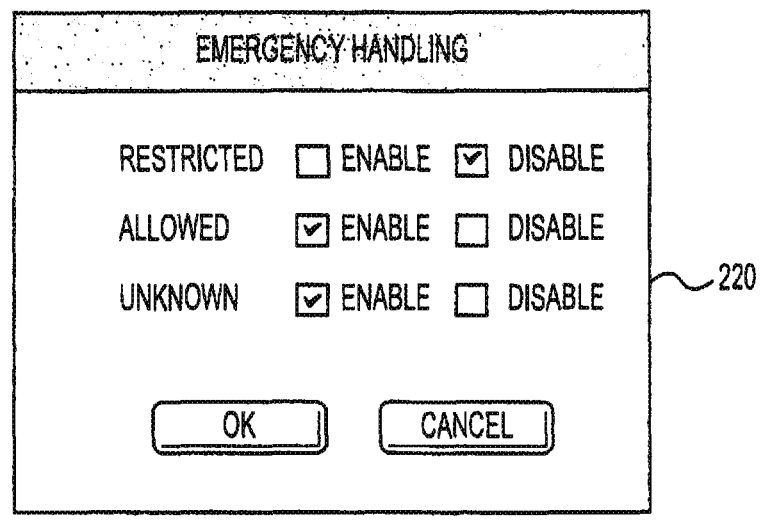
FIG. 3 illustrates an exemplary interface for enabling emergency access.

An optional feature of the INAC 100 is emergency access override to allow processing of emergency access, the method of which is shown in FIG. 6D, blocks 461-465. Depending on the type of installation and the security requirements, emergency access may need to be available, and thus may be enabled or disabled. Emergency access can be configured based on each type of subscriber device; restricted, allowed, or unknown. FIG. 3 is an interface 220 that allows a system operator to enable or disable emergency access for each of the three subscriber device types (restricted, allowed, and unknown). When emergency access is enabled, per FIG. 6D, blocks 461-465, the emergency access module 150 of the INAC 100 allows the subscriber's device 20 to be redirected to the wireless network 10 when that device 20 dials an emergency access number such as 911. Upon completion of the emergency access, the subscriber's device 20 returns to a locked to INAC condition, as appropriate. When emergency access is disabled, the INAC 100 ignores all call access from subscribers whose devices 20 are locked to the INAC 100.

The INAC 100 provides for location sensitive operations, an example of which, as noted above, involves an aircraft. The INAC 100 may be installed on an aircraft so that certain devices (e.g., those of crew members) may be used for wireless communications at any time. Alternatively, the INAC 100 may be used to control access to wireless communications based on the aircraft's location (latitude, longitude, and altitude) or any aspect or aircraft operation.

The INAC 100 may include an optional security and intercept module 160 that is used for lawful intercept of wireless communications using a direct Internet connection (or other available connection type) to a monitoring station. When enabled at the INAC 100, the security and intercept module 160 allows law enforcement personnel to monitor and record conversations and data transfers (packet and circuit), call signaling messages, accessed features, and SMS originated or terminated messages for targeted wireless devices that are currently locked to the INAC 100 and allowed localized services on the INAC 100 system.

There are many possible deployment options for the INAC 100. For example, the INAC 100 may be implemented as a permanent part of the wireless communications network 10. The INAC 100 also may be implemented as a standalone device that overlays one or more wireless communications networks so that all wireless communications in a specific location are capable of some form of access restriction. One example of this wireless feature is to establish an INAC 100 at a building, a facility, or a campus.

Installation of the INAC 100 as part of a network, or as a standalone device can be permanent or temporary. For example, the INAC 100 may be available as a mobile device, along with the necessary amplifiers, RF distribution, antennae and repeaters, so that a disaster recovery operation may invoke wireless access restrictions in the area where the disaster recovery is taking place. Upon completion of the disaster recovery operations, the access limitation area is disestablished.

When the INAC 100 operates to restrict wireless communications by way of a wireless network, there may still be a need to provide some form of private network communications in the wireless access limited area, the method of which is shown in FIG. 6D, blocks 466-468. To provide this additional functionality, the INAC 100 may include a private network module 170 that allows for limited wireless voice communications using either a commercial technology such as GSM or CDMA, or voice over IP (VoIP) technology, including session initiated protocol/unlicensed mobile access (SIP/UMA). As additional wireless technologies become viable, these can be added to the private network solution as well. The private network module 170 also allows for connection to a PBX or PSTN.

The INAC 100 may also provide the capability to individually access the locked wireless devices overtly or covertly thus allowing the exchange of information or enabling the ability to provoke action from the wireless device.

Figure 4:
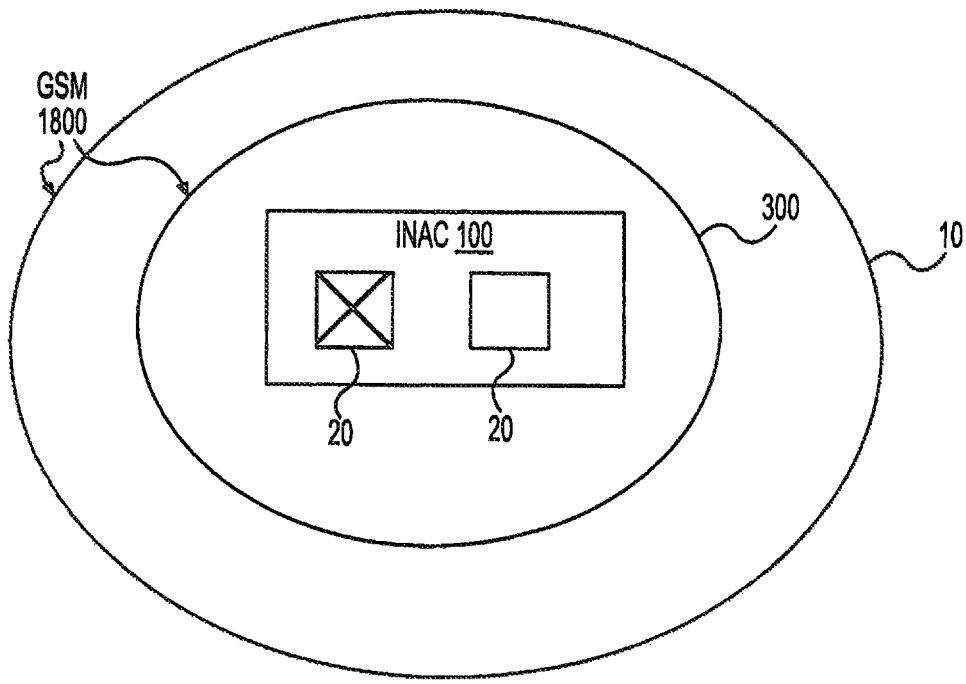
FIG. 4 illustrates a single technology implementation of the controller of FIG. 1.
Figure 5:
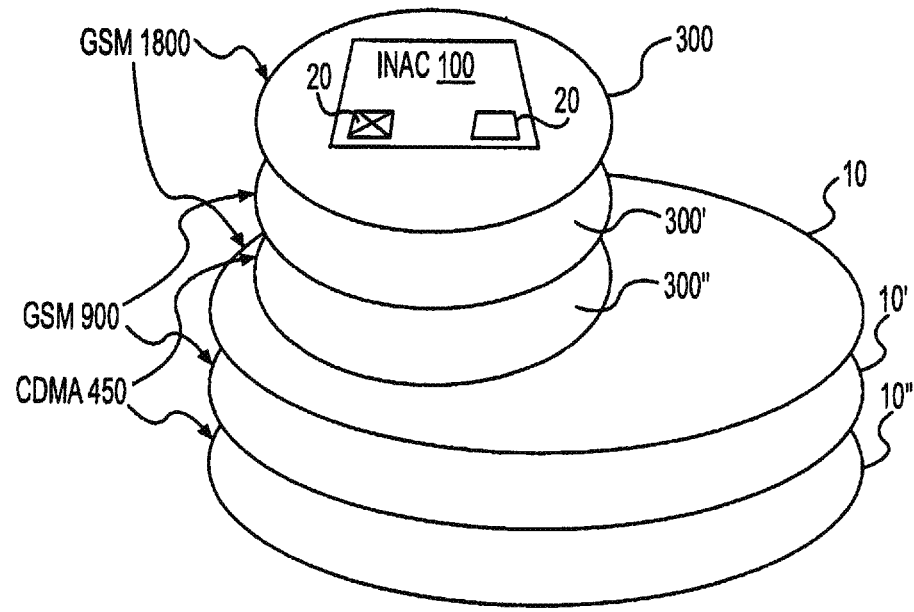
FIG. 5 illustrates a multiple technology implementation of the controller of FIG. 1.

As noted above, the INAC 100 may be used to control wireless access for one wireless technology, and/or for one frequency range, or for multiple technologies and frequency ranges. FIGS. 4 and 5 show this functionality, with examples of current wireless protocols illustrated. One skilled in the art will appreciate that other protocols would apply equally, including wireless protocols to be developed in the future. In FIG. 4, the INAC 100 is used to create restricted wireless access area 300 as an overly to wireless network 10, where the wireless network 10 and the restricted access area 300 are based on GSM 1800 protocols. In FIG. 5, three wireless technologies are shown and, correspondingly, three restricted access areas (300, 300', 300"). In a further alternative, the INAC 100 may be used to create restricted access areas for only a subset of the protocols of a multi-protocol wireless network.

FIGS. 6A-6D illustrate an embodiment of a method for creating a local wireless network and for controlling wireless communications using the local wireless network.

We claim:

1. A computer-implemented method for dynamically controlling wireless communications, comprising:
    establishing, using a first network access controller, a targeted coverage area as an overlay to a portion of a wireless network; and
    at the first wireless network access controller:
        establishing an attraction process that compels wireless devices within the targeted coverage area to attempt to register with the first network access controller,
        receiving a registration signal from a wireless device, and
        determining an access category for the wireless device based on the received registration signal, comprising:
            enabling wireless communication access limitations for a first category of wireless devices, wherein the first network access controller provides to the wireless device, an appearance of operating on the wireless network;
            allowing limited wireless communications access for a second category of wireless devices, wherein the first network access controller:
                directs second category wireless devices to attempt registration with the wireless network for a specific communication, and
                redirects the second wireless device to re-register with the first wireless network access controller after completion of the specific communication; and
            allowing unlimited wireless communications for a third category of wireless devices, wherein the first network access controller redirects third category wireless devices to attempt registration with the wireless network.

2. The method of claim 1, wherein establishing an attraction process comprises implementing a signal that mimics a signal of the wireless network.

3. The method of claim 2, wherein the mimicked signal comprises a same signal pattern, set of parameters, and characteristics as the existing wireless network.

4. The method of claim 2, wherein the mimicked signal comprises a mimic of a base station signal of the wireless network for a first technology.

5. The method of claim 4, wherein the mimicked signal further comprises a base station signal of a second technology not in use by the wireless network.

6. The method of claim 5, wherein the base station signal of the second technology is broadcast continuously.

7. The method of claim 5, wherein the base station signal of the second technology is broadcast intermittently.

8. The method of claim 5, wherein the base station signal of the second technology is broadcast based on a triggered event.

9. The method of claim 8, wherein the triggered event comprises a change in security level requirements in the targeted coverage area.

10. The method of claim 8, wherein the triggered event comprises a calendar-based criterion.

11. The method of claim 8, wherein the triggered event comprises a change of location of the wireless device.

12. The method of claim 8, wherein the triggered event comprises a change of location of the first wireless network access controller.

13. The method of claim 5, wherein the base station signal of the second technology is broadcast randomly.

14. The method of claim 4, wherein the mimicked signal comprises a base station signal of a third technology in use by the wireless network.

15. The method of claim 2, wherein the first wireless network access controller establishes a plurality of targeted coverage areas as overlays to one or more portions of the wireless network.

16. The method of claim 15, wherein the plurality of targeted coverage areas comprises an area for each technology of the wireless network.

17. The method of claim 15, wherein the plurality of targeted coverage areas comprises a subset of the technologies of the wireless network.

18. The method of claim 17, wherein the mimicked signal comprises a mimic of a base station signal of each technology of the subset of technologies of the wireless network for a first technology.

19. The method of claim 2, further comprising connecting the mimicked signal only to the first wireless network controller.

20. The method of claim 1, wherein the first network access controller operates in a disabled mode, wherein access to the wireless network is allowed for all wireless devices in the targeted coverall area.

21. The method of claim 1, wherein the first network access controller operates in a virtual jam mode, wherein access to the wireless network is blocked for all wireless devices in the targeted coverage area.

22. The method of claim 1, wherein the targeted coverage area is established as overlays to a plurality of different wireless networks.

23. The method of claim 1, wherein the specific communication is an emergency access communication.

24. The method of claim 23, wherein the emergency communication is a 911 call.

25. The method of claim 23, further comprising disabling emergency access by any wireless device in the targeted coverage area.

26. The method of claim 1, wherein the targeted coverage area is mobile with respect to a geographical point on Earth.

27. The method of claim 1, wherein the first network access controller is a standalone wireless controller, and wherein the wireless network operates under control of a second wireless network access controller.

28. The method of claim 1, wherein the first wireless network access controller is established as an adjunct to a second wireless network access controller that controls operation of the wireless network.

29. The method of claim 28, wherein the wireless network is a private wireless network.

30. A system for controlling communications on an existing wireless network by creating a targeted coverage area overlaying the existing wireless network, comprising:
radio frequency distribution equipment; and
an intelligent network access controller coupled to the radio frequency distribution equipment, comprising:
an equipment identity module that receives and stores information identifying wireless devices that enter the targeted coverage area,
an access module that determines which of the wireless devices in the targeted coverage area are allowed access to the existing wireless network by:
establishing an attraction process that compels wireless devices within the targeted coverage area to register with the intelligent network access controller;
locking the wireless device to the intelligent network access controller; and
establishing access limitations for the wireless device, comprising:
preventing wireless communication access for a first category of wireless devices, wherein the intelligent network access controller provides to the wireless devices, an appearance of operating on the wireless network,
allowing limited wireless communications access for a second category of wireless devices, wherein the intelligent network access controller;
directs second category wireless devices to attempt registration with the existing wireless network for a specific communication, and upon completion of the specific communication, redirects the second wireless device to re-register with the intelligent wireless network access controller; and
allowing unlimited wireless communications for a third category of wireless devices, wherein the intelligent network access controller redirects third category wireless devices to attempt registration with the existing wireless network.

31. The system of claim 30, wherein to establish the attraction process, the intelligent network access controller implements a signal that mimics a signal of the existing wireless network.

32. The system of claim 31, wherein the mimicked signal comprises a same signal pattern, set of parameters, and characteristics as the existing wireless network.

33. The system of claim 32, wherein the intelligent wireless network access controller establishes a plurality of targeted coverage areas as overlays to one or more portions of the existing wireless network.

34. The system of claim 33, wherein the plurality of targeted coverage areas comprises an area for each technology of the existing wireless network.

35. The system of claim 33, wherein the plurality of targeted coverage areas comprises a subset of the technologies of the existing wireless network.

36. The method of claim 35, wherein the mimicked signal comprises a mimic of a base station signal of each technology of the subset of technologies of the existing wireless network for a first technology.

37. The system of claim 31, wherein the mimicked signal comprises a mimic of a base station signal of the existing wireless network for a first technology.

38. The system of claim 37, wherein the mimicked signal further comprises a base station signal of a second technology not in use by the existing wireless network.

39. The system of claim 38, wherein the base station signal of the second technology is broadcast continuously.

40. The system of claim 38, wherein the base station signal of the second technology is broadcast intermittently.

41. The system of claim 38, wherein the base station signal of the second technology is broadcast based on a triggered event.

42. The system of claim 41, wherein the triggered event comprises a change in security level requirements in the targeted coverage area.

43. The system of claim 41, wherein the triggered event comprises a calendar-based criterion.

44. The system of claim 41, wherein the triggered event comprises a change of location of the wireless device.

45. The system of claim 41, wherein the triggered event comprises a change of location of the intelligent wireless network access controller.

46. The system of claim 38, wherein the base station signal of the second technology is broadcast randomly.

47. The system of claim 37, wherein the mimicked signal comprises a base station signal of a third technology in use by the existing wireless network.

48. The method of claim 31, further comprising connecting the mimicked signal only to the intelligent wireless network controller.

49. A system for dynamically controlling wireless communications in an existing wireless network, comprising:
an intelligent network access controller; and
a non-transitory computer-readable storage medium having encoded thereon a program of instructions that, when executed cause the controller to:
establish a targeted coverage area as an overlay to a portion of an existing wireless network; and
establish an attraction process that compels wireless devices within the targeted coverage area to attempt to register with the controller,
receive a registration signal from a wireless device, and
determine an access category for the wireless device based on the received registration signal, by:
blocking wireless communication access for a first category of wireless devices, wherein the controller provides to the wireless device, an appearance of operating on the existing wireless network; and allowing unlimited wireless communications for a second category of wireless devices, wherein the controller redirects second category wireless devices to attempt registration with the existing wireless network.

50. The system of claim 49, further comprising allowing limited wireless communications access for a third category of wireless devices, wherein the controller:
   directs third category wireless devices to attempt registration with the existing wireless network for a specific communication; and
   after completion of the specific communication, redirects the third category wireless device to re-register with the controller.

51. A computer-implemented method for dynamically controlling access to a wireless communications network, comprising:
   establishing, using an intelligent network access controller, a targeted coverage area as an overlay to a portion of the wireless communications network;
   compelling wireless devices within the targeted coverage area to attempt to register with the intelligent network access controller,
   receiving a registration signal from a wireless device,
   providing to the wireless device an appearance of operating on the wireless communications network;
   determining an access category for the wireless device; and
   within the targeted coverage area:
      preventing wireless communication access for a first category of wireless devices;
      allowing limited wireless communications access for a second category of wireless devices, wherein the intelligent network access controller:
         allows second category wireless devices to attempt registration with the wireless communications network for a specific communication, and
         after completion of the specific communication, compels the second wireless devices to re-register with the intelligent wireless network access controller; and
      allowing unlimited wireless communications for a third category of wireless devices, wherein the intelligent network access controller permits third category wireless devices to attempt registration with the wireless communications network.

* * * * *